United States Patent
Lange

(10) Patent No.: US 11,333,518 B2
(45) Date of Patent: May 17, 2022

(54) VEHICLE VIRTUAL ASSISTANT SYSTEMS AND METHODS FOR STORING AND UTILIZING DATA ASSOCIATED WITH VEHICLE STOPS

(71) Applicant: Toyota Motor North America, Inc., Plano, TX (US)

(72) Inventor: Armin Lange, Addison, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 279 days.

(21) Appl. No.: 16/572,894

(22) Filed: Sep. 17, 2019

(65) Prior Publication Data
US 2021/0080281 A1    Mar. 18, 2021

(51) Int. Cl.
| | |
|---|---|
| *G01C 21/36* | (2006.01) |
| *B60K 35/00* | (2006.01) |
| *G07C 5/08* | (2006.01) |
| *G01C 21/34* | (2006.01) |

(52) U.S. Cl.
CPC .......... *G01C 21/3608* (2013.01); *B60K 35/00* (2013.01); *G01C 21/3484* (2013.01); *G07C 5/0841* (2013.01); *B60K 2370/148* (2019.05); *B60K 2370/166* (2019.05)

(58) Field of Classification Search
USPC ........................................................ 701/419
See application file for complete search history.

(56) References Cited

U.S. PATENT DOCUMENTS

| | | | |
|---|---|---|---|
| 7,233,861 B2 | 6/2007 | Van Buer et al. | |
| 7,835,859 B2 | 11/2010 | Bill | |
| 8,781,716 B1 | 7/2014 | Wenneman et al. | |
| 9,658,620 B1 | 5/2017 | Urmson et al. | |
| 2004/0128066 A1* | 7/2004 | Kudo ............... | G08G 1/096866 701/468 |
| 2010/0082230 A1* | 4/2010 | Hong .................. | G01C 21/362 701/533 |
| 2010/0299021 A1* | 11/2010 | Jalili ..................... | G07C 5/085 701/33.4 |

(Continued)

FOREIGN PATENT DOCUMENTS

WO     0074019 A1     12/2000

OTHER PUBLICATIONS

Simmons, R. et al., "Learning to predict driver route and destination intent", Accessed Jun. 24, 2019; URL: http://www.cs.cmu.edu/~brettb/papers/06itsc-driver-intent.pdf.

*Primary Examiner* — Tyler D Paige
(74) *Attorney, Agent, or Firm* — Dinsmore & Shohl LLP

(57) ABSTRACT

A virtual assistance system for a vehicle is provided. The virtual assistance system includes one or more processors, one or more memory modules communicatively coupled to the one or more processors, an input device communicatively coupled to the one or more processors, an output device communicatively coupled to the one or more processors, and machine readable instructions stored in the one or more memory modules. The virtual assistance system detects a duration of a vehicle stop. When the duration of the stop is greater than a predetermined threshold, the system requests a reason for the stop, receives the reason for the stop, determines a location, date, and time of the stop, and stores a record comprising data associated with the stop.

20 Claims, 4 Drawing Sheets

(56) References Cited

U.S. PATENT DOCUMENTS

| | | | |
|---|---|---|---|
| 2011/0004370 A1* | 1/2011 | Nagase | G08G 1/01 |
| | | | 701/33.4 |
| 2011/0251788 A1 | 10/2011 | Yarvis et al. | |
| 2014/0280527 A1* | 9/2014 | Chatterjee | H04L 67/22 |
| | | | 709/204 |
| 2015/0127258 A1 | 5/2015 | Mont-Reynaud et al. | |
| 2016/0265922 A1* | 9/2016 | Thakur | G05D 1/0212 |
| 2019/0303857 A1* | 10/2019 | Lecue | G06F 16/29 |
| 2021/0080281 A1* | 3/2021 | Lange | G01C 21/343 |

\* cited by examiner

VEHICLE VIRTUAL ASSISTANT SYSTEMS AND METHODS FOR STORING AND UTILIZING DATA ASSOCIATED WITH VEHICLE STOPS

TECHNICAL FIELD

Embodiments described herein generally relate to vehicle virtual assistance systems and, more specifically, to vehicle virtual assistance systems for storing and utilizing data associated with vehicle stops.

BACKGROUND

A driver of a vehicle may make a variety of stops over time. In some instances, the driver may make stops for various reasons according to a particular pattern. Conventional vehicles and vehicle systems may not track stops and the reasons for stopping in a manner that may be useful.

Accordingly, a need exists for a vehicle virtual assistance system that may store and utilize data associated with vehicle stops in a useful manner.

SUMMARY

In one embodiment, a virtual assistance system for a vehicle includes one or more processors, one or more memory modules communicatively coupled to the one or more processors, an input device communicatively coupled to the one or more processors, an output device communicatively coupled to the one or more processors, and machine readable instructions stored in the one or more memory modules. The virtual assistance system detects a duration of a vehicle stop. When the duration of the vehicle stop is greater than a predetermined threshold, the virtual assistance system requests, through the output device, a reason for the vehicle stop, receives, through the input device, a stated reason for the vehicle stop, determines a location of the vehicle stop, determines a time and date of the vehicle stop, and stores a record comprising data associated with the stop.

In another embodiment, a virtual assistance system for a vehicle includes one or more processors, one or more memory modules communicatively coupled to the one or more processors, an input device communicatively coupled to the one more processors, and an output device communicatively coupled to the one or more processors. The memory modules store data associated with a plurality of vehicle stops including a reason for each stop. The vehicle virtual assistance system determines a suggested vehicle route based at least in part on the data associated with the plurality of vehicle stops.

In another embodiment, a method comprises detecting a vehicle stop, determining a duration of the vehicle stop, requesting a reason for the vehicle stop, receiving a stated reason for the vehicle stop, determining a location of the vehicle stop, determining a time and date of the vehicle stop, and storing a record comprising the duration of the stop, the location of the stop, the time and date of the stop, and the stated reason for the stop.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicle virtual assistance systems for storing and utilizing data associated with previous vehicle stops. The vehicle virtual assistance system includes one or more processors, one or more memory modules communicatively coupled to the one or more processors, an input device communicatively coupled to the one or more processors, an output device communicatively coupled to the one or more processors, and machine readable instructions stored in the one or more memory modules.

In embodiments, whenever a vehicle stops at a particular location for greater than a specified duration, the virtual assistance system asks the driver of the vehicle, through the output device, the reason for the stop. The virtual assistance system then receives, through the input device, the driver's reason for the stop and stores this reason along with the time, date, location, and duration of the stop. Over time, after records of a plurality of vehicle stops are recorded, the virtual assistance system can determine one or more patterns of stops of the vehicle. The virtual assistance system can then recommend future stops and/or routes based on these detected patterns.

Figure 1:
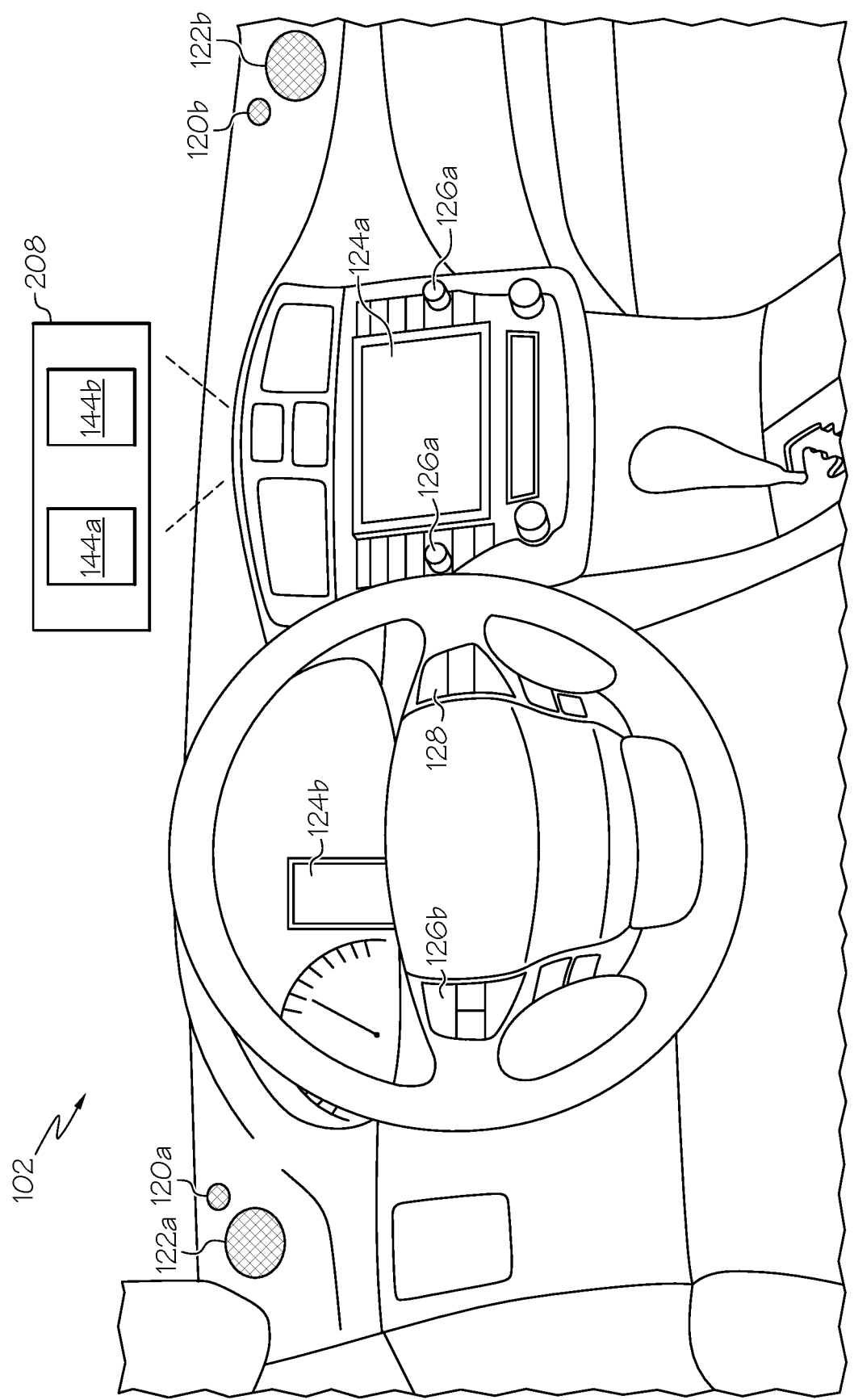
FIG. 1 schematically depicts an interior portion of a vehicle for providing a vehicle virtual assistance system, according to one or more embodiments shown and described herein.

Referring now to the drawings, FIG. 1 schematically depicts an interior portion of a vehicle 102 for providing virtual assistance, according to embodiments disclosed herein. As illustrated, the vehicle 102 may include a number of components that may provide input to or output from the vehicle virtual assistance systems described herein. The interior portion of the vehicle 102 includes a console display 124a and a dash display 124b (referred to independently and/or collectively herein as "display 124"). The console display 124a may be configured to provide one or more user interfaces and may be configured as a touch screen and/or include other features for receiving user input. The dash display 124b may similarly be configured to provide one or more interfaces, but often the data provided in the dash display 124b is a subset of the data provided by the console display 124a. Regardless, at least a portion of the user interfaces depicted and described herein may be provided on either or both the console display 124a and the dash display 124b. The vehicle 102 also includes one or more microphones 120a, 120b (referred to independently and/or collectively herein as "microphone 120") and one or more speakers 122a, 122b (referred to independently and/or collectively herein as "speaker 122"). The microphone 120 may be configured for receiving user voice commands and/or other inputs to the vehicle virtual assistance systems described herein. Similarly, the speaker 122 may be utilized for providing audio content from the vehicle virtual assistance system to the user. The microphone 120, the speaker 122, and/or related components may be part of an in-vehicle audio system. The vehicle 102 also includes tactile input hardware 126a and/or peripheral tactile input hardware 126b for receiving tactile user input, as will be described in further detail below. The vehicle 102 also includes an activation switch 128 for providing an activation input to the vehicle virtual assistance system, as will be described in further detail below.

The vehicle 102 may also include a virtual assistance module 208, which stores voice input analysis logic 144a, and route analysis logic 144b. The voice input analysis logic 144a and the route analysis logic 144b may include a plurality of different pieces of logic, each of which may be embodied as a computer program, firmware, and/or hardware, as an example. The voice input analysis logic 144a may be configured to execute one or more local speech recognition algorithms on speech input received from the microphone 120, as will be described in further detail below. The route analysis logic 144b may be configured to suggested future vehicle routes and/or stops, as will be described in further detail below.

Figure 2:
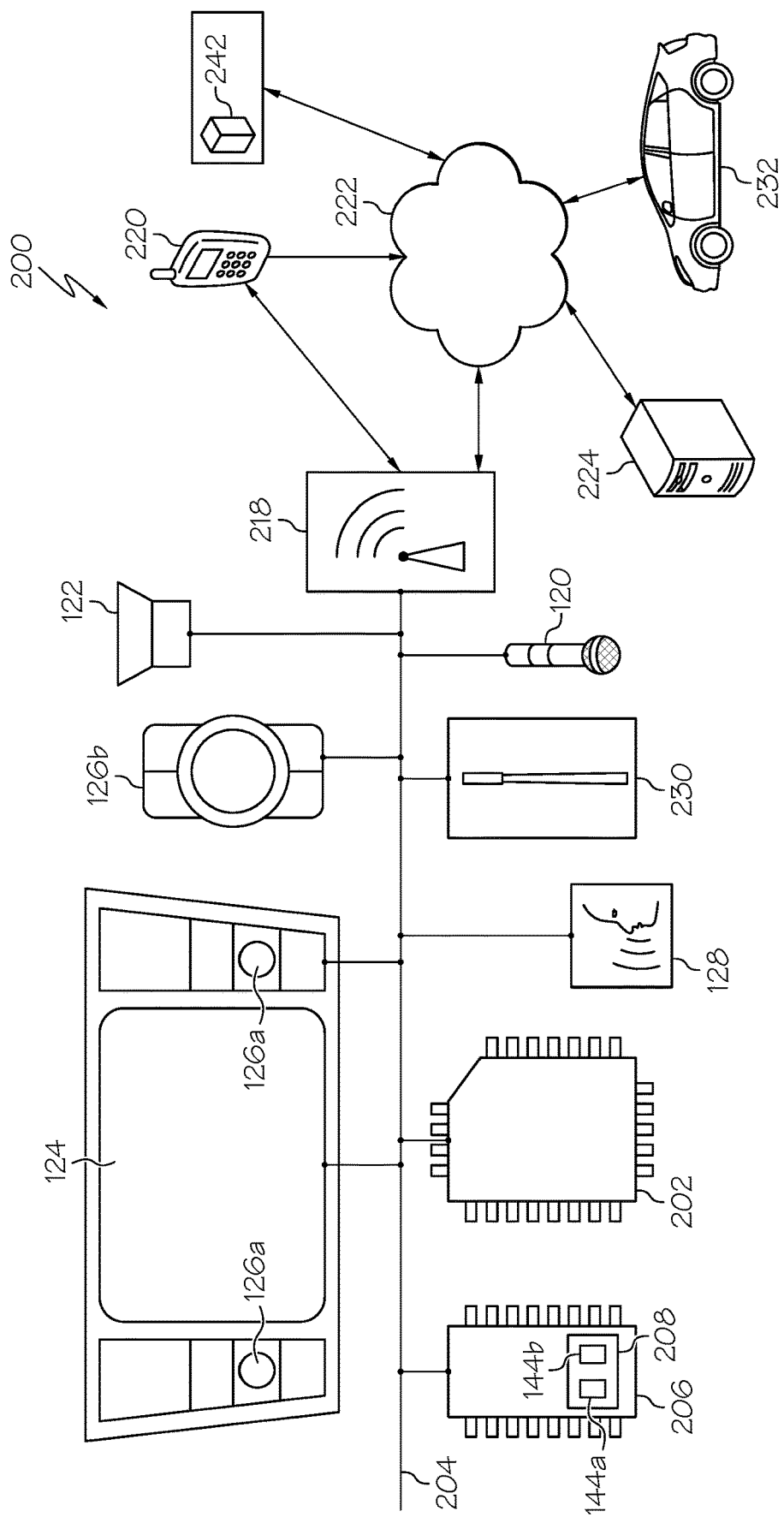
FIG. 2 schematically depicts a vehicle virtual assistance system, according to one or more embodiments shown and described herein.

Referring now to FIG. 2, an embodiment of a vehicle virtual assistance system 200, including a number of the components depicted in FIG. 1, is schematically depicted. It should be understood that the vehicle virtual assistance system 200 may be integrated within the vehicle 102 or may be embedded within a mobile device (e.g., smartphone, laptop computer, etc.) carried by a driver of the vehicle.

The vehicle virtual assistance system 200 includes one or more processors 202, a communication path 204, one or more memory modules 206, a display 124, a speaker 122, tactile input hardware 126a, a peripheral tactile input hardware 126b, a microphone 120, an activation switch 128, a virtual assistance module 208, network interface hardware 218, and a satellite antenna 230. The various components of the vehicle virtual assistance system 200 and the interaction thereof will be described in detail below.

As noted above, the vehicle virtual assistance system 200 includes the communication path 204. The communication path 204 may be formed from any medium that is capable of transmitting a signal such as, for example, conductive wires, conductive traces, optical waveguides, or the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 204 communicatively couples the various components of the vehicle virtual assistance system 200. As used herein, the term "communicatively coupled" means that coupled components are capable of exchanging data signals with one another such as, for example, electrical signals via conductive medium, electromagnetic signals via air, optical signals via optical waveguides, and the like.

As noted above, the vehicle virtual assistance system 200 includes the one or more processors 202. Each of the one or more processors 202 may be any device capable of executing machine readable instructions. Accordingly, each of the one or more processors 202 may be a controller, an integrated circuit, a microchip, a computer, or any other computing device. The one or more processors 202 are communicatively coupled to the other components of the vehicle virtual assistance system 200 by the communication path 204. Accordingly, the communication path 204 may communicatively couple any number of processors with one another, and allow the modules coupled to the communication path 204 to operate in a distributed computing environment. Specifically, each of the modules may operate as a node that may send and/or receive data.

As noted above, the vehicle virtual assistance system 200 includes the one or more memory modules 206. Each of the one or more memory modules 206 of the vehicle virtual assistance system 200 is coupled to the communication path 204 and communicatively coupled to the one or more processors 202. The one or more memory modules 206 may comprise RAM, ROM, flash memories, hard drives, or any device capable of storing machine readable instructions such that the machine readable instructions may be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 206. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the one or more memory modules 206 include the virtual assistance module 208 that processes speech input signals received from the microphone 120 and/or extracts speech information from such signals, as will be described in further detail below. Furthermore, the one or more memory modules 206 include machine readable instructions that, when executed by the one or more processors 202, cause the vehicle virtual assistance system 200 to perform the actions described below including the steps described in FIGS. 3 and 4. The virtual assistance module 208 includes voice input analysis logic 144a and route analysis logic 144b.

The voice input analysis logic 144a and route analysis logic 144b may be stored in the one or more memory modules 206. In embodiments, the voice input analysis logic 144a and route analysis logic 144b may be stored on, accessed by and/or executed on the one or more processors 202. In embodiments, the voice input analysis logic 144a and route analysis logic 144b may be executed on and/or distributed among other processing systems to which the one or more processors 202 are communicatively linked. For example, at least a portion of the voice input analysis logic 144a and/or the route analysis logic 144b may be located onboard the vehicle 102. In one or more arrangements, a first portion of the voice input analysis logic 144a and/or the route analysis logic 144b may be located onboard the vehicle 102, and a second portion of the voice input analysis logic 144a and/or the route analysis logic 144b may be located remotely from the vehicle 102 (e.g., on a cloud-based server, a remote computing system, and/or the one or more processors 202). In some embodiments, the voice input analysis logic 144a and/or the route analysis logic 144b may be located remotely from the vehicle 102.

The voice input analysis logic 144a may be implemented as computer readable program code that, when executed by a processor, implements one or more of the various processes described herein. The voice input analysis logic 144a may be a component of one or more processors 202, or the voice input analysis logic 144a may be executed on and/or distributed among other processing systems to which one or more processors 202 is operatively connected. In one or more arrangements, the voice input analysis logic 144a may include artificial or computational intelligence elements, e.g., neural network, fuzzy logic or other machine learning algorithms.

The voice input analysis logic 144a may receive one or more occupant voice inputs from one or more vehicle occupants of the vehicle 102. The one or more occupant voice inputs may include any audial data spoken, uttered, pronounced, exclaimed, vocalized, verbalized, voiced, emitted, articulated, and/or stated aloud by a vehicle occupant. The one or more occupant voice inputs may include one or more letters, one or more words, one or more phrases, one or more sentences, one or more numbers, one or more expressions, and/or one or more paragraphs, etc.

The one or more occupant voice inputs may be sent to, provided to, and/or otherwise made accessible to the voice input analysis logic 144a. The voice input analysis logic 144a may be configured to analyze the occupant voice inputs. The voice input analysis logic 144a may analyze the occupant voice inputs in various ways. For example, the voice input analysis logic 144a may analyze the occupant voice inputs using any known natural language processing system or technique. Natural language processing may include analyzing each user's notes for topics of discussion, deep semantic relationships and keywords. Natural language processing may also include semantics detection and analysis and any other analysis of data including textual data and unstructured data. Semantic analysis may include deep and/or shallow semantic analysis. Natural language processing may also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing may use stochastic, probabilistic and statistical methods. In some embodiments, the voice input analysis logic 144a may analyze the occupant voice inputs to identify the occupant. For example, the voice input analysis logic 144a may compare the occupant voice inputs with samples associated with different users, and identify that the occupant voice inputs are comparable to a sample associated with a certain user.

The route analysis logic 144b may be implemented as computer readable program code that, when executed by a processor, implements one or more of the various processes described herein. The route analysis logic 144b may be a component of one or more processors 202, or the route analysis logic 144b may be executed on and/or distributed among other processing systems to which one or more processors 202 is operatively connected. In one or more arrangements, the route analysis logic 144b may include artificial or computational intelligence elements, e.g., neural network, fuzzy logic or other machine learning algorithms.

As explained in further detail below, the route analysis logic 144b may analyze data related to vehicle stops to determine patterns. The route analysis logic 144b can determine patterns by determining correlations between time, day of the week or month, location, duration of stop, and/or reason for the stop, among other possibilities.

Still referring to FIG. 2, the vehicle virtual assistance system 200 comprises the display 124 for providing visual output such as, for example, information, entertainment, maps, navigation, information, or a combination thereof. The display 124 is coupled to the communication path 204 and communicatively coupled to the one or more processors 202. Accordingly, the communication path 204 communicatively couples the display 124 to other modules of the vehicle virtual assistance system 200. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 124 may include at least one of the one or more processors 202 and the one or memory modules 206. While the vehicle virtual assistance system 200 includes a display 124 in the embodiment depicted in FIG. 2, the vehicle virtual assistance system 200 may not include a display 124 in other embodiments, such as embodiments in which the vehicle virtual assistance system 200 audibly provides outback or feedback via the speaker 122.

As noted above, the vehicle virtual assistance system 200 includes the speaker 122 for transforming data signals from the vehicle virtual assistance system 200 into mechanical vibrations, such as in order to output audible prompts or audible information from the vehicle virtual assistance system 200. The speaker 122 is coupled to the communication path 204 and communicatively coupled to the one or more processors 202.

Still referring to FIG. 2, the vehicle virtual assistance system 200 comprises tactile input hardware 126a coupled to the communication path 204 such that the communication path 204 communicatively couples the tactile input hardware 126a to other modules of the vehicle virtual assistance system 200. The tactile input hardware 126a may be any device capable of transforming mechanical, optical, or electrical signals into a data signal capable of being transmitted with the communication path 204. Specifically, the tactile input hardware 126a may include any number of movable objects that each transform physical motion into a data signal that may be transmitted to over the communication path 204 such as, for example, a button, a switch, a knob, a microphone or the like. In some embodiments, the display 124 and the tactile input hardware 126a are combined as a single module and operate as an audio head unit or an infotainment system. However, it is noted, that the display 124 and the tactile input hardware 126a may be separate from one another and operate as a single module by exchanging signals via the communication path 204. While the vehicle virtual assistance system 200 includes tactile input hardware 126a in the embodiment depicted in FIG. 2, the vehicle virtual assistance system 200 may not include tactile input hardware 126a in other embodiments, such as embodiments that do not include the display 124.

As noted above, the vehicle virtual assistance system 200 optionally comprises the peripheral tactile input hardware 126b coupled to the communication path 204 such that the communication path 204 communicatively couples the peripheral tactile input hardware 126b to other modules of the vehicle virtual assistance system 200. For example, in one embodiment, the peripheral tactile input hardware 126b is located in a vehicle console to provide an additional location for receiving input. The peripheral tactile input hardware 126b operates in a manner substantially similar to the tactile input hardware 126a, i.e., the peripheral tactile input hardware 126b includes movable objects and transforms motion of the movable objects into a data signal that may be transmitted over the communication path 204.

As noted above, the vehicle virtual assistance system 200 comprises the microphone 120 for transforming acoustic vibrations received by the microphone into a speech input signal. The microphone 120 is coupled to the communication path 204 and communicatively coupled to the one or more processors 202. As will be described in further detail below, the one or more processors 202 may process the speech input signals received from the microphone 120 and/or extract speech information from such signals.

Still referring to FIG. 2, the vehicle virtual assistance system 200 comprises the activation switch 128 for activating or interacting with the vehicle virtual assistance system 200. In some embodiments, the activation switch 128 is an electrical switch that generates an activation signal when depressed, such as when the activation switch 128 is depressed by a user when the user desires to utilize or interact with the vehicle virtual assistance system 200. In some embodiments, the vehicle virtual assistance system 200 does not include the activation switch. Instead, when a user says a certain word (e.g., "Roxy"), the vehicle virtual assistance system 200 becomes ready to recognize words spoken by the user.

As noted above, the vehicle virtual assistance system 200 includes the network interface hardware 218 for communicatively coupling the vehicle virtual assistance system 200 with a mobile device 220 or a computer network. The network interface hardware 218 is coupled to the communication path 204 such that the communication path 204 communicatively couples the network interface hardware 218 to other modules of the vehicle virtual assistance system 200. The network interface hardware 218 may be any device capable of transmitting and/or receiving data via a wireless network. Accordingly, the network interface hardware 218 may include a communication transceiver for sending and/or receiving data according to any wireless communication standard. For example, the network interface hardware 218 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 218 includes a Bluetooth transceiver that enables the vehicle virtual assistance system 200 to exchange information with the mobile device 220 (e.g., a smartphone) via Bluetooth communication.

Still referring to FIG. 2, data from various applications running on the mobile device 220 may be provided from the mobile device 220 to the vehicle virtual assistance system 200 via the network interface hardware 218. The mobile device 220 may be any device having hardware (e.g., chipsets, processors, memory, etc.) for communicatively coupling with the network interface hardware 218 and a cellular network 222. Specifically, the mobile device 220 may include an antenna for communicating over one or more of the wireless computer networks described above. Moreover, the mobile device 220 may include a mobile antenna for communicating with the cellular network 222. Accordingly, the mobile antenna may be configured to send and receive data according to a mobile telecommunication standard of any generation (e.g., 1G, 2G, 3G, 4G, 5G, etc.). Specific examples of the mobile device 220 include, but are not limited to, smart phones, tablet devices, e-readers, laptop computers, or the like.

The cellular network 222 generally includes a plurality of base stations that are configured to receive and transmit data according to mobile telecommunication standards. The base stations are further configured to receive and transmit data over wired systems such as public switched telephone network (PSTN) and backhaul networks. The cellular network 222 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the cellular network 222 may be utilized as a wireless access point by the network interface hardware 218 or the mobile device 220 to access one or more servers (e.g., a server 224). The server 224 generally includes processors, memory, and chipset for delivering resources via the cellular network 222. Resources may include providing, for example, processing, storage, software, and information from the server 224 to the vehicle virtual assistance system 200 via the cellular network 222.

Still referring to FIG. 2, the one or more servers accessible by the vehicle virtual assistance system 200 via the communication link of the mobile device 220 to the cellular network 222 may include third party servers that provide additional speech recognition capability. For example, the server 224 may include speech recognition algorithms capable of recognizing more words than the local speech recognition algorithms stored in the one or more memory modules 206. It should be understood that the network interface hardware 218 or the mobile device 220 may be communicatively coupled to any number of servers by way of the cellular network 222.

The network interface hardware 218 may be communicatively coupled to the cellular network 222 and may communicate with another vehicle 232 and a map server 242 via the cellular network 222. The vehicle virtual assistance system 200 may retrieve map information from the map server 242. The vehicle virtual assistance system 200 may also retrieve information about local businesses (e.g., grocery stores, restaurants, etc.) from the map server 242.

As noted above, the vehicle virtual assistance system 200 optionally includes a satellite antenna 230 coupled to the communication path 204 such that the communication path 204 communicatively couples the satellite antenna 230 to other modules of the vehicle virtual assistance system 200. The satellite antenna 230 is configured to receive signals from global positioning system (GPS) satellites. Specifically, in one embodiment, the satellite antenna 230 includes one or more conductive elements that interact with electromagnetic signals transmitted by GPS satellites. The received signal is transformed into a data signal indicative of the location (e.g., latitude and longitude) of the satellite antenna 230 or an object positioned near the satellite antenna 230, by the one or more processors 202.

Additionally, it is noted that the satellite antenna 230 may include at least one of the one or more processors 202 and the one or memory modules 206. In embodiments where the vehicle virtual assistance system 200 is coupled to a vehicle, the one or more processors 202 execute machine readable instructions to transform the GPS satellite signals received by the satellite antenna 230 into data indicative of the current location of the vehicle. While the vehicle virtual assistance system 200 includes the satellite antenna 230 in the embodiment depicted in FIG. 2, the vehicle virtual assistance system 200 may not include the satellite antenna 230 in other embodiments, such as embodiments in which the vehicle virtual assistance system 200 does not utilize GPS satellite information or embodiments in which the vehicle virtual assistance system 200 obtains GPS satellite information from the mobile device 220 via the network interface hardware 218.

Still referring to FIG. 2, it should be understood that the vehicle virtual assistance system 200 may be formed from a plurality of modular units, i.e., the display 124, the speaker 122, tactile input hardware 126a, the peripheral tactile input hardware 126b, the microphone 120, the activation switch 128, etc. may be formed as modules that when communicatively coupled form the vehicle virtual assistance system 200. Accordingly, in some embodiments, each of the modules may include at least one of the one or more processors 202 and/or the one or more memory modules 206. Accordingly, it is noted that, while specific modules may be described herein as including a processor and/or a memory module, the embodiments described herein may be implemented with the processors and memory modules distributed throughout various communicatively coupled modules.

Figure 3:
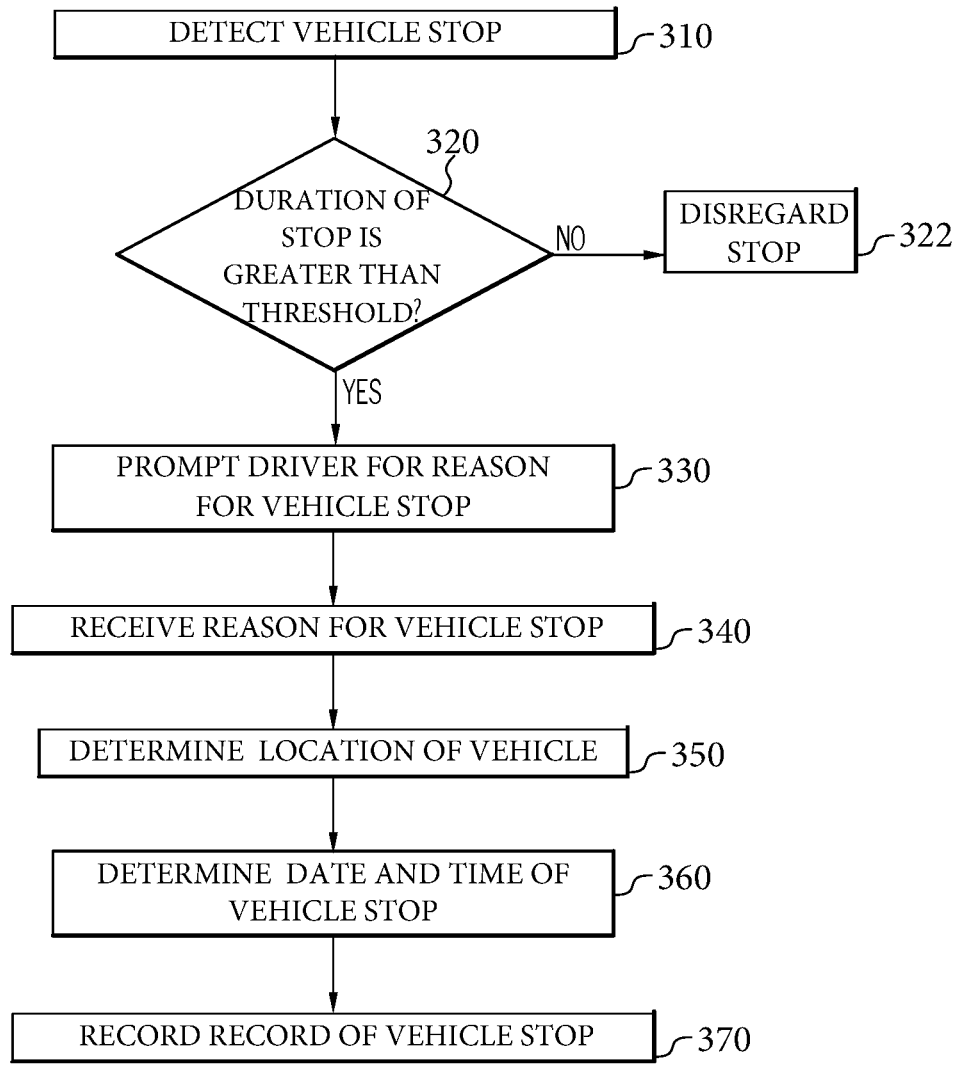
FIG. 3 depicts a flowchart for recording data associated with a vehicle stop, according to one or more embodiments shown and described herein.

FIG. 3 depicts a flowchart for recording vehicle stop information, according to one or more embodiments shown and described herein. In block 310, the vehicle virtual assistance system 200 determines that the vehicle 102 has come to a stop. In some embodiments, the vehicle virtual assistance system 200 determines that the vehicle 102 has come to a stop if the vehicle's speedometer registers a speed of zero. In other embodiments, the vehicle virtual assistance system 200 determines that the vehicle 102 has come to a stop when the vehicle's location, as determined by the GPS signal received by the satellite antenna 230, is not changing for a predetermined duration of time.

After the vehicle 102 has come to a stop, in block 320, the vehicle virtual assistance system 200 measures the duration of the stop and determines whether the duration of the stop is greater than a predetermined threshold duration (e.g., 30 seconds, 1 minute, 2 minutes). In some embodiments, the predetermined threshold is set such that short traffic stops (e.g., stops at stop signs or traffic lights) can be ignored. In some examples, the predetermined threshold can be adjusted by a user (e.g., via providing input through the microphone 120, the tactile input hardware 126a, the peripheral tactile input hardware 126b, and the like). In some embodiments, the vehicle virtual assistance system 200 starts a timer whenever the vehicle 102 comes to a stop to measure the duration of vehicle stops. If the vehicle virtual assistance system 200 determines in block 320 that the duration of the stop is not greater than the predetermined threshold, then in block 322, the stop is disregarded.

If the vehicle virtual assistance system 200 determines in block 320 that the duration of the stop is greater than the predetermined threshold, the in block 330, the vehicle virtual assistance system 200 prompts the driver for the reason for the stop. In some embodiments, the driver is prompted by an audio prompt played through the speaker 122 asking the driver what the purpose of the stop is. In other embodiments, the driver is prompted through a visual prompt on the display 124.

If the driver is out of the vehicle 102 when the vehicle virtual assistance system 200 determines that the duration of the stop is greater than the threshold, the vehicle virtual assistance system 200 prompts the driver for the reason for the stop after the driver returns to the vehicle 102. In some embodiments, the vehicle 102 has a weight sensor in the driver's seat to determine whether the driver is present in the vehicle.

After the vehicle virtual assistance system 200 prompts the driver of the vehicle 102 for the reason for the vehicle stop at block 330, the driver may give a reason for the stop. In some embodiments, the driver verbally speaks a reason for the stop and the stated reason is detected by the microphone 120. For example, the driver may say "getting groceries," "stopping for gas," "eating dinner" or a variety of other reasons for the vehicle stop. In some embodiments, rather than speaking the reason for the vehicle stop, the driver may input the reason through the tactile display 126 or touch screen 124.

In block 340, the vehicle virtual assistance system 200 receives the reason for the stop from the driver (e.g., through the microphone 120, through the tactile input hardware 126a, through the peripheral tactile input hardware 126b, through touchscreen input on the display 124, and the like). In embodiments where the driver speaks the reason for the vehicle stop, the voice input analysis logic 144a can analyze the spoken words of the driver to determine a reason for the stop. In some embodiments, the voice input analysis logic 144a can extract a spoken category (e.g., groceries, gasoline, bank, visiting family). In other embodiments, the voice input analysis logic 144a can extract other features from the reason spoken by the driver.

In block 350, the vehicle virtual assistance system 200 determines the location of the vehicle 102 during the vehicle stop. In some embodiments, the vehicle virtual assistance system 200 determines the location of the vehicle 102 based on GPS signals received by the satellite antenna 230.

In block 360, the vehicle virtual assistance system 200 determines the date and time of the vehicle stop. In some embodiments, the vehicle virtual assistance system 200 determines the date and time by accessing a clock of the vehicle 102.

In block 370, the vehicle virtual assistance system 200 stores a record of the vehicle stop comprising the date and time of the stop, the duration of the stop, the location of the stop, and the reason for the stop. In some embodiments, the record is stored in the one or more memory modules 206. In other embodiments, the record is transmitted and stored remotely from the vehicle 102 (e.g., in a cloud-based server, such as the server 224 of FIG. 2).

In some embodiments, the steps of FIG. 3 are performed every time that the vehicle 102 comes to a stop. Thus, over time, the vehicle virtual assistance system 200 will amass a large amount of data about stops made by the vehicle 102. As the amount of stored data relating to vehicle stops increases, the route analysis logic 144b analyzes this data to determine patterns. The route analysis logic 144b can determine patterns by determining correlations between time, day of the week or month, location, duration of stop, and/or reason for the stop.

The route analysis logic 144b may determine a variety of different patterns based on the recorded data of vehicle stops and the vehicle virtual assistance system 200 may make suggestions for future stops and/or routes based on these patterns. One pattern that the route analysis logic 144*b* may detect is that the vehicle 102 stops at a particular location at regular intervals. For example, the route analysis logic 144*b* may determine that the vehicle 102 stops at a particular location every weekday morning with the stated reason of getting coffee. In this example, on future driving trips on weekday mornings, the vehicle virtual assistance system 200 may suggest a route that most conveniently passes the location serving coffee.

Another example pattern that the route analysis logic 144*b* may detect is that the vehicle 102 stops at a particular type of location at particular times (e.g., the vehicle stops at a bank every Friday afternoon). In this example, when the vehicle 102 is in use on a Friday afternoon, the vehicle virtual assistance system 200 may find the nearest bank and suggest a route to the driver that passes that bank.

In another example, the route analysis logic 144*b* may determine that the vehicle 102 often stops for a long period of time at a particular traffic light on weekday mornings. In this example, on future weekday mornings, the vehicle virtual assistance system may suggest an alternate route that avoids the location of the traffic light in order to save the driver time on her commute.

In another example, the route analysis logic 144*b* may determine that the vehicle 102 stops at a variety of different restaurants on Saturday evenings. In this example, the vehicle virtual assistance system 200 may, on a future Saturday evening, locate a restaurant that has not been visited and suggest a route that visits the restaurant.

In another example, the route analysis logic 144*b* may determine that the vehicle 102 often stops for the reason of family entertainment on the weekends. In this example, the vehicle virtual assistance system 200 may suggest routes that pass other family entertainment establishments on future weekend driving trips.

In some embodiments, the vehicle 102 contains weight sensors on one or more of the vehicle seats. In these embodiments, the vehicle virtual assistance system 200 may determine that the driver's family is in the car based on the weight sensors, and suggest stops that have family friendly entertainment options.

In some embodiments, the route analysis logic 144*b* analyzes the data after a threshold number of vehicle stops have been recorded (e.g., 10 stops) to look for patterns. After the route analysis logic 144*b* determines one or more patterns of stops by the vehicle 102, the vehicle virtual assistance system 200 may suggest stops and/or routes to the driver of the vehicle 102 on future driving trips based on the patterns detected, as explained in further detail below.

As explained above, the route analysis logic 144*b* determines patterns based on stored data about vehicle stops and correlations between different data about those stops such as the date and time of the stop, the location of the stop, and the reason for the stop. Thus, the vehicle virtual assistance system 200 can suggest vehicle routes at appropriate times. For example, if the route analysis logic 144*b* determines that the vehicle 102 stops at a grocery store every Wednesday evening, the vehicle virtual assistance system 200 can suggest a route that passes a grocery store if the car is being used on Wednesday evening. Other patterns detected by the route analysis logic 144*b* that correlate to specific dates and times will cause the vehicle virtual assistance system 200 to suggest a route when the vehicle is in use at an appropriate date and time related to the detected pattern.

Figure 4:
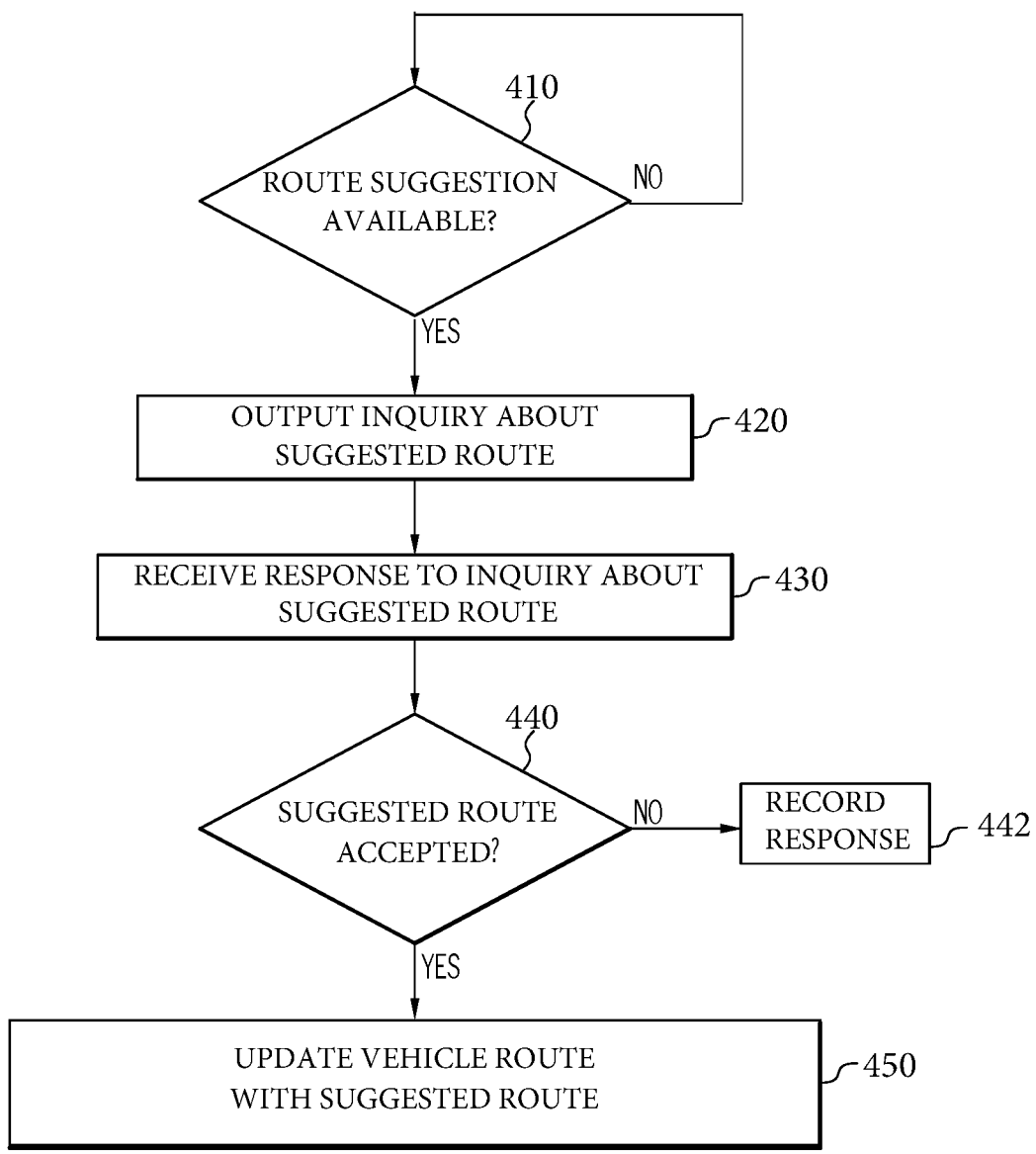
FIG. 4 depicts a flowchart for suggesting a vehicle route, according to one or more embodiments shown and described herein.

FIG. 4 depicts a flowchart for suggesting a vehicle route, according to one or more embodiments shown and described herein. In block 410, the vehicle virtual assistance system 200 determines whether a vehicle route suggestion is available based on the date and time that the vehicle 102 is in use. If a route suggestion is not available, control returns to block 410. If a route suggestion is available, control advances to block 420.

In block 420, the vehicle virtual assistance system 200 outputs an inquiry about the suggested route, such as by asking the driver if she would like to take the suggested route. In some embodiments, the vehicle virtual assistance system 200 suggests a route by playing a message through the speaker 122 asking if the driver would like to take the suggested route. In some embodiments, the vehicle virtual assistance system 200 states a reason for making the suggestion (e.g., noting to the driver that they seem to stop at this location every weekday morning).

In block 430, the vehicle virtual assistance system 200 receives a response as to whether the driver would like to take the suggested route. In some embodiments, the response is received by the driver verbalizing a response through the microphone 120. In other embodiments, the driver may input a response using the tactile input hardware 126*a* and/or peripheral tactile input hardware 126*b* or the touch screen of the display 124.

In block 440, the vehicle virtual assistance system 200 determines whether the driver has accepted the suggested route based on the response received. If the vehicle virtual assistance system 200 determines that the suggested route has not been accepted, in block 442 an appropriate record is recorded in the memory modules 206 noting that the suggested route was not accepted. The route analysis logic 144*b* can use this information to make future route suggestions. For example, if a particular route suggestion is not accepted after a certain number of times, the suggestion can stop being made.

If the vehicle virtual assistance system 200 determines that the suggested route has been accepted at block 440, in block 450, the updated route can be made the active route by, for example, updating the vehicle's navigation system with the suggested route.

If the driver indicates she would like to take the suggested route, the vehicle virtual assistance system 200 updates the vehicle's navigation system with the suggested route. If the driver indicates that she would not like to take the suggested route, no change is made to the vehicle's navigation system. In some embodiments, the vehicle virtual assistance system 200 records the driver's response and the route analysis logic 144*b* uses the response to make future route suggestions. For example, if the driver declines a suggested route several times, the vehicle virtual assistance system 200 may stop making the suggestion.

It should be understood that embodiments described herein provide for vehicle virtual assistance systems for storing and utilizing data associated with vehicle stops. The vehicle virtual assistance system includes one or more processors, one or more memory modules communicatively coupled to the one or more processors, an input device communicatively coupled to the one or more processors, and an output device communicatively coupled to the one or more processors. When a vehicle has stopped for greater than a predetermined threshold, the virtual assistance system requests, through the output device, that the driver give a reason for the vehicle stop and receives, through the input device, a stated reason for the vehicle stop. Information about the vehicle stop is then stored by the virtual assistance system. After data about a number of vehicle stops have been recorded, the virtual assistance system may suggest future stops and or routes based on this data.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A virtual assistance system for a vehicle, the virtual assistance system comprising:
   one or more processors;
   one or more memory modules communicatively coupled to the one or more processors;
   an input device communicatively coupled to the one or more processors;
   an output device communicatively coupled to the one or more processors; and
   machine readable instructions stored in the one or more memory modules that cause the virtual assistance system to perform at least the following when executed by the one or more processors:
      detect a duration of a vehicle stop and, when the detected duration is greater than a predetermined threshold:
         request, through the output device, a reason for the vehicle stop;
         receive, through the input device, a stated reason for the vehicle stop;
         determine a location of the vehicle stop;
         determine a time and date of the vehicle stop; and
         store a record comprising data associated with the stop.

2. The virtual assistance system of claim 1, wherein the data associated with the stop comprises the duration of the stop, the location of the stop, the time of the stop, the date of the stop, and the stated reason for the vehicle stop.

3. The virtual assistance system of claim 1, wherein the virtual assistance system further comprises voice input analysis logic to perform speech recognition on the stated reason for the vehicle stop.

4. The virtual assistance system of claim 1, wherein after receiving the stated reason for the vehicle stop, the system determines a category to associate with the stop based on the stated reason.

5. The virtual assistance system of claim 1, further comprising route analysis logic to determine a suggested vehicle route based on the data associated with the stop.

6. The virtual assistance system of claim 5, wherein the suggested vehicle route includes a stop at a suggested location that is related to the stated reason for the stop.

7. The virtual assistance system of claim 5, wherein the system outputs an inquiry, through the output device, as to whether a driver of the vehicle would like to take the suggested route.

8. The virtual assistance system of claim 7, wherein, when the driver responds to the inquiry, through the input device, that they would like to take the suggested route, the system enters the suggested route into a navigation system of the vehicle.

9. A virtual assistance system for a vehicle, the virtual assistance system comprising:
   one or more processors;
   one or more memory modules communicatively coupled to the one or more processors, wherein the memory modules store data associated with a plurality of vehicle stops, wherein the data comprises a reason for each stop;
   an input device communicatively coupled to the one or more processors;
   an output device communicatively coupled to the one or more processors; and
   machine readable instructions stored in the one or more memory modules that cause the virtual assistance system to perform at least the following when executed by the one or more processors:
      determine a suggested vehicle route based at least in part on the data associated with the plurality of vehicle stops.

10. The virtual assistance system of claim 9, wherein the data associated with the plurality of vehicle stops includes a duration of each stop, a location of each stop, a time of each stop, a date of each stop, and the reason for each stop.

11. The virtual assistance system of claim 9, wherein the suggested vehicle route includes at least one suggested stop based at least in part on the data associated with the plurality of vehicle stops.

12. The virtual assistance system of claim 11, wherein the at least one suggested stop is based at least in part on a current time.

13. The virtual assistance system of claim 11, wherein the at least one suggested stop is based at least in part on a current date.

14. The virtual assistance system of claim 11, wherein the machine readable instructions cause the virtual assistance system to:
   determine at least one pattern of vehicle stops based on the data associated with the plurality of vehicle stops; and
   determine the suggested vehicle route based at least in part on the at least one determined pattern.

15. A method comprising:
   detecting, by a processor of the vehicle, a vehicle stop;
   determining a duration of the vehicle stop;
   requesting, by an output device, a reason for the vehicle stop;
   receiving, by an input device, a stated reason for the vehicle stop;
   determining a location of the vehicle stop;
   determining a time and date of the vehicle stop; and
   storing a record comprising the duration of the stop, the location of the stop, the time and date of the stop, and the stated reason for the stop.

16. The method of claim 15, further comprising performing speech recognition on the stated reason for the vehicle stop.

17. The method of claim 15, further comprising determining a category to associate with the stop based on the stated reason.

18. The method of claim 15, further comprising:
   determining a suggested vehicle route based at least in part on the stored record.

19. The method of claim 18, wherein the suggested vehicle route comprises a suggested stop based at least in part of the stored record.

20. The method of claim 18, further comprising:
   outputting, through the output device, an inquiry as to whether to make the suggested route the actual route of the vehicle;

receiving, through the input device, a response as to whether to make the suggested route the actual route; and making the suggested route the actual route after receiving a request to do so.

\* \* \* \* \*